(12) United States Patent
Meirav et al.

(10) Patent No.: US 9,919,257 B2
(45) Date of Patent: Mar. 20, 2018

(54) SYSTEMS AND METHODS FOR EFFICIENT HEATING OF SORBENTS IN AN INDOOR AIR SCRUBBER

(71) Applicant: Enverid Systems, Inc., Needham, MA (US)

(72) Inventors: Udi Meirav, Newton, MA (US); Israel Biran, Avihayil (IL)

(73) Assignee: Enverid Systems, Inc., Needham, MA (US)

( * ) Notice: Subject to any disclaimer, the term of this patent is extended or adjusted under 35 U.S.C. 154(b) by 58 days.

(21) Appl. No.: 15/022,800

(22) PCT Filed: Sep. 17, 2014

(86) PCT No.: PCT/US2014/056097
§ 371 (c)(1),
(2) Date: Mar. 17, 2016

(87) PCT Pub. No.: WO2015/042150
PCT Pub. Date: Mar. 26, 2015

(65) Prior Publication Data
US 2016/0228809 A1 Aug. 11, 2016

Related U.S. Application Data

(60) Provisional application No. 61/879,099, filed on Sep. 17, 2013.

(51) Int. Cl.
*B01D 53/04* (2006.01)

(52) U.S. Cl.
CPC ...... *B01D 53/0462* (2013.01); *B01D 2257/11* (2013.01); *B01D 2257/302* (2013.01);
(Continued)

(58) Field of Classification Search
CPC ............ B01D 53/0462; B01D 2257/11; B01D 2257/302; B01D 2257/402;
(Continued)

(56) References Cited

U.S. PATENT DOCUMENTS

| | | |
|---|---|---|
| 1,522,480 A | 1/1925 | Allen |
| 1,836,301 A | 12/1931 | Bechtold |

(Continued)

FOREIGN PATENT DOCUMENTS

| | | |
|---|---|---|
| CA | 2640152 A1 | 4/2010 |
| CN | 2141873 Y | 9/1993 |

(Continued)

OTHER PUBLICATIONS

Machine-generated English translation of JP 06-031132 A, published Feb. 1994.*

(Continued)

*Primary Examiner* — Frank Lawrence
(74) *Attorney, Agent, or Firm* — Cooley LLP

(57) ABSTRACT

Embodiments of the present disclosure are directed to systems and methods for regenerating a sorbent material of a scrubber, configured for scrubbing a contaminant from indoor air from an enclosed space. Some embodiments include a sorbent material portion (SMP) including a sorbent material, which may be configured to be cycled between an adsorption phase for adsorbing a contaminant from indoor air, and a regeneration phase configured for releasing at least a portion of the contaminant adsorbed by the sorbent material during the adsorption phase thereof, via temperature swing adsorption, into a purging airflow.

16 Claims, 5 Drawing Sheets

(52) U.S. Cl.
CPC .. *B01D 2257/402* (2013.01); *B01D 2257/404* (2013.01); *B01D 2257/502* (2013.01); *B01D 2257/504* (2013.01); *B01D 2257/708* (2013.01); *B01D 2259/4508* (2013.01); *B01D 2259/65* (2013.01); *Y02C 10/08* (2013.01); *Y02C 20/10* (2013.01)

(58) Field of Classification Search
CPC ........ B01D 2257/404; B01D 2257/502; B01D 2257/504; B01D 2257/708; B01D 2259/4508; B01D 2259/65; Y02C 10/08; Y02C 20/10
USPC .... 95/114, 115, 148; 96/121, 126–128, 130, 96/143, 146
See application file for complete search history.

(56) References Cited

U.S. PATENT DOCUMENTS

| | | | |
|---|---|---|---|
| 3,107,641 A | 10/1963 | Haynes | |
| 3,511,595 A | 5/1970 | Fuchs | |
| 3,619,130 A | 11/1971 | Ventriglio et al. | |
| 3,702,049 A | 11/1972 | Morris, Jr. | |
| 3,751,878 A | 8/1973 | Collins | |
| 3,808,773 A | 5/1974 | Reyhing et al. | |
| 3,885,927 A | 5/1975 | Sherman et al. | |
| 3,885,928 A | 5/1975 | Wu | |
| 4,182,743 A | 1/1980 | Rainer et al. | |
| 4,228,197 A | 10/1980 | Means | |
| 4,249,915 A | 2/1981 | Sircar et al. | |
| 4,292,059 A | 9/1981 | Kovach | |
| 4,322,394 A | 3/1982 | Mezey et al. | |
| 4,325,921 A | 4/1982 | Aiken et al. | |
| 4,433,981 A | 2/1984 | Slaugh et al. | |
| 4,451,435 A | 5/1984 | Holter et al. | |
| 4,472,178 A * | 9/1984 | Kumar | B01D 53/0462 95/139 |
| 4,530,817 A | 7/1985 | Hölter et al. | |
| 4,551,304 A | 11/1985 | Holter et al. | |
| 4,559,066 A | 12/1985 | Hunter et al. | |
| 4,711,645 A | 12/1987 | Kumar | |
| 4,810,266 A | 3/1989 | Zinnen et al. | |
| 4,816,043 A | 3/1989 | Harrison | |
| 4,892,719 A | 1/1990 | Gesser | |
| 4,917,862 A | 4/1990 | Kraw et al. | |
| 4,987,952 A | 1/1991 | Beal et al. | |
| 5,046,319 A | 9/1991 | Jones | |
| 5,087,597 A | 2/1992 | Leal et al. | |
| 5,137,548 A | 8/1992 | Grenier et al. | |
| 5,186,903 A | 2/1993 | Cornwell | |
| 5,221,520 A | 6/1993 | Cornwell | |
| 5,231,063 A | 7/1993 | Fukumoto et al. | |
| 5,281,254 A | 1/1994 | Birbara et al. | |
| 5,290,345 A | 3/1994 | Osendorf et al. | |
| 5,292,280 A | 3/1994 | Janu et al. | |
| 5,322,473 A | 6/1994 | Hofstra et al. | |
| 5,352,274 A | 10/1994 | Blakley | |
| 5,376,614 A | 12/1994 | Birbara et al. | |
| 5,389,120 A | 2/1995 | Sewell et al. | |
| 5,407,465 A | 4/1995 | Schaub et al. | |
| 5,464,369 A | 11/1995 | Federspiel | |
| 5,492,683 A | 2/1996 | Birbara et al. | |
| 5,584,916 A | 12/1996 | Yamashita et al. | |
| 5,646,304 A | 7/1997 | Acharya et al. | |
| 5,672,196 A | 9/1997 | Acharya et al. | |
| 5,675,979 A | 10/1997 | Shah | |
| 5,702,505 A | 12/1997 | Izumi et al. | |
| 5,707,005 A | 1/1998 | Ketler et al. | |
| 5,827,355 A | 10/1998 | Wilson | |
| 5,869,323 A | 2/1999 | Horn | |
| 5,876,488 A | 3/1999 | Birbara et al. | |
| 5,948,355 A | 9/1999 | Fujishima et al. | |
| 5,964,927 A | 10/1999 | Graham et al. | |
| 5,984,198 A | 11/1999 | Bennett et al. | |
| 6,024,781 A | 2/2000 | Bulow et al. | |
| 6,027,550 A | 2/2000 | Vickery | |
| 6,102,793 A | 8/2000 | Hansen | |
| 6,123,617 A | 8/2000 | Johnson | |
| 6,113,674 A | 9/2000 | Graham et al. | |
| 6,187,596 B1 | 2/2001 | Dallas et al. | |
| 6,280,691 B1 | 8/2001 | Homeyer et al. | |
| 6,364,938 B1 | 4/2002 | Birbara et al. | |
| 6,375,722 B1 | 4/2002 | Henderson et al. | |
| 6,402,809 B1 | 6/2002 | Monereau et al. | |
| 6,432,367 B1 | 8/2002 | Munk | |
| 6,432,376 B1 | 8/2002 | Choudhary et al. | |
| 6,533,847 B2 | 3/2003 | Seguin et al. | |
| 6,547,854 B1 | 4/2003 | Gray et al. | |
| 6,605,132 B2 | 8/2003 | Fielding | |
| 6,623,550 B2 | 9/2003 | Shah | |
| 6,711,470 B1 | 3/2004 | Hartensten et al. | |
| 6,726,558 B1 | 4/2004 | Meirav | |
| 6,773,477 B2 | 8/2004 | Lindsay | |
| 6,796,896 B2 | 9/2004 | Laiti | |
| 6,797,246 B2 | 9/2004 | Hopkins | |
| 6,866,701 B2 | 3/2005 | Meirav | |
| 6,908,497 B1 | 6/2005 | Sirwardane | |
| 6,916,239 B2 | 7/2005 | Siddaramanna et al. | |
| 6,916,360 B2 | 7/2005 | Seguin et al. | |
| 6,930,193 B2 | 8/2005 | Yaghi et al. | |
| 6,964,692 B2 | 11/2005 | Gittleman et al. | |
| 6,974,496 B2 | 12/2005 | Wegeng et al. | |
| 7,288,136 B1 | 10/2007 | Gray et al. | |
| 7,407,533 B2 | 8/2008 | Steins | |
| 7,407,633 B2 | 8/2008 | Potember et al. | |
| 7,449,053 B2 | 11/2008 | Hallam | |
| 7,472,554 B2 | 1/2009 | Vosburgh | |
| 7,645,323 B2 | 1/2010 | Massenbauer-Strafe et al. | |
| 7,662,746 B2 | 2/2010 | Yaghi et al. | |
| 7,666,077 B1 | 2/2010 | Thelen | |
| 7,802,443 B2 | 9/2010 | Wetzel | |
| 7,846,237 B2 | 12/2010 | Wright et al. | |
| 7,891,573 B2 | 2/2011 | Finkam et al. | |
| 8,157,892 B2 | 4/2012 | Meirav | |
| 8,317,890 B2 | 11/2012 | Raether et al. | |
| 8,398,753 B2 | 3/2013 | Sergi et al. | |
| 8,491,710 B2 | 7/2013 | Meirav | |
| 8,734,571 B2 * | 5/2014 | Golden | B01D 53/0462 95/106 |
| 2001/0021363 A1 | 9/2001 | Poles et al. | |
| 2001/0054415 A1 | 12/2001 | Hanai et al. | |
| 2002/0056373 A1 | 5/2002 | Fielding | |
| 2002/0078828 A1 | 6/2002 | Kishkovich et al. | |
| 2002/0083833 A1 | 7/2002 | Nalette et al. | |
| 2002/0147109 A1 | 10/2002 | Branover et al. | |
| 2002/0183201 A1 | 12/2002 | Barnwell et al. | |
| 2002/0193064 A1 | 12/2002 | Michalakos et al. | |
| 2003/0037672 A1 * | 2/2003 | Sircar | B01D 53/0462 95/96 |
| 2003/0097086 A1 | 5/2003 | Gura | |
| 2003/0188745 A1 | 10/2003 | Deas et al. | |
| 2004/0005252 A1 | 1/2004 | Siess | |
| 2004/0069144 A1 | 4/2004 | Wegeng et al. | |
| 2004/0118287 A1 | 6/2004 | Jaffe et al. | |
| 2005/0133196 A1 | 6/2005 | Gagnon et al. | |
| 2005/0191219 A1 | 9/2005 | Uslenghi et al. | |
| 2005/0262869 A1 | 12/2005 | Tongu et al. | |
| 2005/0284291 A1 | 12/2005 | Alizadeh-Khiavi et al. | |
| 2006/0032241 A1 | 2/2006 | Gontcharov et al. | |
| 2006/0054023 A1 | 3/2006 | Raetz et al. | |
| 2006/0079172 A1 | 4/2006 | Fleming et al. | |
| 2006/0148642 A1 | 7/2006 | Ryu et al. | |
| 2006/0225569 A1 | 10/2006 | Schmidt et al. | |
| 2006/0249019 A1 | 11/2006 | Roychoudhury et al. | |
| 2008/0119356 A1 | 3/2008 | Ryu et al. | |
| 2008/0078289 A1 | 4/2008 | Sergi et al. | |
| 2008/0127821 A1 | 6/2008 | Noack et al. | |
| 2008/0135060 A1 | 6/2008 | Kuo et al. | |
| 2008/0182506 A1 | 7/2008 | Jackson et al. | |
| 2008/0210768 A1 | 9/2008 | You | |
| 2008/0293976 A1 | 11/2008 | Olah et al. | |
| 2009/0000621 A1 | 1/2009 | Haggblom et al. | |
| 2009/0120288 A1 | 5/2009 | Lackner et al. | |

(56) References Cited

U.S. PATENT DOCUMENTS

| | | | |
|---|---|---|---|
| 2009/0220388 A1 | 9/2009 | Monzyk et al. | |
| 2009/0260372 A1 | 10/2009 | Skinner et al. | |
| 2010/0076605 A1 | 3/2010 | Harrod et al. | |
| 2010/0154636 A1 | 6/2010 | Liu et al. | |
| 2010/0224565 A1 | 9/2010 | Dunne et al. | |
| 2010/0254868 A1 | 10/2010 | Obee et al. | |
| 2010/0262298 A1 | 10/2010 | Johnson et al. | |
| 2010/0275775 A1* | 11/2010 | Griffiths | B01D 53/0454 95/18 |
| 2010/0278711 A1 | 11/2010 | Find | |
| 2011/0064607 A1 | 3/2011 | Hedman | |
| 2011/0079143 A1 | 4/2011 | Marotta et al. | |
| 2011/0085933 A1 | 4/2011 | Mazyek et al. | |
| 2011/0146494 A1 | 6/2011 | Desai et al. | |
| 2011/0179948 A1 | 7/2011 | Choi et al. | |
| 2011/0189075 A1 | 8/2011 | Wright et al. | |
| 2011/0192172 A1 | 8/2011 | Delacruz | |
| 2011/0198055 A1 | 8/2011 | Meirav et al. | |
| 2011/0206572 A1 | 8/2011 | McKenna et al. | |
| 2011/0250121 A1 | 10/2011 | Schmidt | |
| 2011/0262327 A1 | 10/2011 | Dillon et al. | |
| 2011/0265648 A1 | 11/2011 | Meirav | |
| 2011/0269919 A1 | 11/2011 | Min et al. | |
| 2011/0277490 A1 | 11/2011 | Meirav | |
| 2011/0296872 A1 | 12/2011 | Eisenberger | |
| 2012/0004092 A1 | 1/2012 | Raatschen et al. | |
| 2012/0012005 A1 | 1/2012 | Burke | |
| 2012/0052786 A1 | 3/2012 | Clawsey | |
| 2012/0076711 A1 | 3/2012 | Gebald et al. | |
| 2012/0129267 A1 | 5/2012 | Daly | |
| 2012/0137876 A1 | 6/2012 | Miller | |
| 2012/0148858 A1 | 6/2012 | Wu | |
| 2012/0152116 A1* | 6/2012 | Barclay | F28F 9/26 95/113 |
| 2012/0168113 A1 | 7/2012 | Karamanos | |
| 2012/0216676 A1 | 8/2012 | Addiego et al. | |
| 2012/0222500 A1 | 9/2012 | Riess et al. | |
| 2012/0272966 A1 | 11/2012 | Ando et al. | |
| 2012/0311926 A1 | 12/2012 | Mittelmark | |
| 2012/0321511 A1 | 12/2012 | Lorcheim | |
| 2013/0052113 A1 | 2/2013 | Molins et al. | |
| 2014/0326428 A1 | 11/2014 | Meirav et al. | |
| 2015/0321135 A1 | 11/2015 | Meirav et al. | |

FOREIGN PATENT DOCUMENTS

| | | |
|---|---|---|
| CN | 2729562 Y | 9/2005 |
| CN | 1872388 A | 12/2006 |
| CN | 101072620 A | 11/2007 |
| CN | 101199913 A | 6/2008 |
| CN | 101444693 A | 6/2009 |
| CN | 101500704 A | 8/2009 |
| CN | 101564634 A | 10/2009 |
| CN | 201363833 Y | 12/2009 |
| CN | 202032686 U | 11/2011 |
| CN | 103119376 A | 5/2013 |
| CN | 103119376 A | 5/2013 |
| ES | 2387791 A1 | 4/1983 |
| ES | 2387791 A1 | 10/2012 |
| JP | 56-158126 A | 12/1981 |
| JP | 59-225232 A | 12/1984 |
| JP | 60194243 | 10/1985 |
| JP | 02-092373 A | 3/1990 |
| JP | 5-161843 A | 6/1993 |
| JP | 06-031132 A * | 2/1994 |
| JP | 09085043 A | 3/1997 |
| JP | 200291978 A | 10/2000 |
| JP | 2001-170435 A | 6/2001 |
| JP | 2001232127 A | 8/2001 |
| JP | 3207936 B2 | 9/2001 |
| JP | 2005-090941 A | 4/2005 |
| JP | 2006275487 A | 10/2006 |
| JP | 2009-202137 A | 9/2009 |
| JP | 2010-149086 A | 7/2010 |
| WO | WO 88805693 | 8/1988 |
| WO | WO 2002008160 A1 | 1/2002 |
| WO | WO 200212796 A2 | 2/2002 |
| WO | WO 2007128584 A1 | 11/2007 |
| WO | WO 2008155543 A2 | 12/2008 |
| WO | WO 2009126607 A2 | 10/2009 |
| WO | WO 2010091831 A1 | 8/2010 |
| WO | WO 2010124388 A1 | 11/2010 |
| WO | WO 2011114168 A1 | 9/2011 |
| WO | WO 2011146478 A1 | 11/2011 |
| WO | WO 2012134415 A1 | 10/2012 |
| WO | WO 2012158911 A2 | 11/2012 |
| WO | WO 2013074973 A1 | 5/2013 |
| WO | WO 2013106573 A1 | 7/2013 |
| WO | WO 2014015138 | 1/2014 |
| WO | WO 2014047632 | 3/2014 |
| WO | WO 2014078708 | 5/2014 |
| WO | WO 2014153333 | 9/2014 |
| WO | WO 2014176319 | 10/2014 |
| WO | WO 2015042150 | 3/2015 |
| WO | WO 2015123454 | 8/2015 |

OTHER PUBLICATIONS

International Search Report and Written Opinion, dated Nov. 24, 2014, for International Application No. PCT/US2014/056097.

Gesser, H.D., "The Reduction of Indoor Formaldehyde Gas and that Emanating from Urea Formaldehyde Foam Insulation (UFFI)", Environmental International, vol. 10, pp. 305-308, 1984.

Jones, Christopher W., "CO2 Capture from Dilute Gases as a Component of Modern Global Carbon Management", Annual Review of Chemical and Biomolecular Engineering, vol. 2, pp. 31-52, 2011.

Ma, Chanjuan et al., "Removal of low-concentration formaldehyde in air by adsorption on activated carbon modified by hexamethylene diamine", Carbon, vol. 49, pp. 2869-2877, 2011.

Nuckols, M. L. et al., "Technical Manual: Design Guidelines for Carbon Dioxide Scrubbers", Naval Coastal Systems Center, vol. 4110, pp. 1-83, Revision A, Jul. 1985.

United States Environmental Protection Agency, "Carbon Adsorption for Control of VOC Emissions: Theory and Full Scale System Performance", vol. 450, pp. 88-012, Jun. 1988.

Serna-Guerrero, Rodrigo et al., "Triamine-grafted pore-expanded mesoporous silica for CO2 capture: Effect of moisture and adsorbent regeneration strategies", Adsorption, vol. 16, pp. 567-575, 2010.

Sidheswaran, Meera A. et al., "Energy efficient indoor VOC air cleaning with activated carbon filter (ACF) filters", Building and Environment, vol. 47, Apr. 2011, pp. 357-367.

Zorflex® ACC, 100% Activated Woven Carbon Cloth, Calgon Carbon Corporation, 2008, www.calgoncarbon.com, 2 pages.

Zorflex® ACC, 100% Activated Woven Carbon Cloth, Calgon Carbon Corporation, 2011, www.calgoncarbon.com, 2 pages.

Gray, M. L. et al., "Performance of immobilized tertiary amine solid sorbents for the capture of carbon dioxide", International Journal of Greenhouse Gas Control, vol. 2, Issue 1, Jan. 2008, pp. 3-8.

Goeppert et al., "Carbon Dioxide Capture from the Air Using a Polyamine Based Regenerable Solid Adsorbent," J. Am. Chem. Soc., vol. 133, No. 50, Nov. 21, 2011 (Nov. 21, 2011) pp. 20164-20167 entire document.

International Preliminary Report on Patentability, dated Nov. 29, 2012, for PCT/US2011/036801.

International Search Report and the Written Opinion of the International Searching Authority for International Application No. PCT/US2012/024333 dated Sep. 5, 2012.

International Search Report dated Jul. 25, 2013 for International Application No. PCT/US2013/035933, filed Apr. 10, 2013.

International Search Report and Written Opinion, dated Jan. 28, 2013, for PCT/US2012/038343.

International Search Report and Written Opinion, dated Dec. 20, 2013 for PCT/US2013/051077.

International Search Report and Written Opinion, dated Jan. 3, 2014 for PCT/US2013/042239.

(56) References Cited

OTHER PUBLICATIONS

International Search Report and Written Opinion, dated Mar. 22, 2013 for PCT/US2012/065600.
International Search Report and Written Opinion, dated Mar. 29, 2013 for PCT/US2013/021033.
International Search Report and Written Opinion, dated Mar. 17, 2014 for PCT/US2013/070383.
International Search Report and Written Opinion, dated Jul. 10, 2014 for PCT/US2014/023488.
International Search Report and Written Opinion, dated Aug. 15, 2014 for PCT/US2014/031009.
International Search Report and Written Opinion, dated Nov. 24, 2014 for PCT/US2014/056097.
International Preliminary Report on Patentability, dated Jan. 29, 2015 for PCT/US2013/051077.
International Search Report and Written Opinion, dated Dec. 19, 2013 for PCT/US2013/061422.
International Preliminary Report on Patentability, dated Apr. 2, 2015 for PCT/US2013/061422.
International Preliminary Report on Patentability, dated May 28, 2015 for PCT/US2013/070383.
International Search Report and Written Opinion, dated Sep. 2, 2014, for PCT/US2014/035114.
International Search Report and Written Opinion, dated May 15, 2015, for PCT/US2015/015690.
International Search Report and Written Opinion, dated May 5, 2014, for PCT/US2014/011078.
International Preliminary Report on Patentability, dated Jul. 23, 2015, for International Application No. PCT/US2014/011078.
International Preliminary Report on Patentability, dated Oct. 23, 2014, for International Application No. PCT/US2013/035933.

* cited by examiner

SYSTEMS AND METHODS FOR EFFICIENT HEATING OF SORBENTS IN AN INDOOR AIR SCRUBBER

CROSS-REFERENCE TO RELATED APPLICATIONS

This application is a National Stage Entry entitled to and hereby claiming priority under 35 U.S.C. § § 365 and 371 to corresponding PCT Application No. PCT/US2014/056097, filed Sep. 17, 2014, entitled "Systems And Methods For Efficient Heating Of Sorbents In An Indoor Air Scrubber", which in turn claims priority to U.S. Provisional Patent Application No. 61/879,099, filed Sep. 17, 2013, and entitled "Indoor Air Scrubber with a Heat Exchanger", the disclosure of which is incorporated herein by referenced in its entirety.

TECHNICAL FIELD

Embodiments of the present disclosure generally relate to air management systems and particularly to indoor air treatment and contaminant removal therefrom.

BACKGROUND

Sorbent materials are used in gas separation, by selectively adsorbing certain gas species. Some sorbents can be regenerated by means of heat and a purging gas stream, thereby releasing the adsorbed species and allowing repeated use, in a cycle known as temperature swing adsorption.

SUMMARY OF SOME OF THE EMBODIMENTS

Treating indoor air with regenerable solid sorbents may be used as a means to achieving improved indoor air quality and improved economics of heating, ventilation and air conditioning (HVAC). The use of regenerable sorbents in a scrubber incorporated into an air management system allows for long term operation, as a relative small amount of sorbent can be used repeatedly through a two-phase cycle of adsorption and regeneration. During the adsorption phase, contaminants are captured and removed from streaming indoor air, and during regeneration, the captured contaminants are desorbed, or released, and exhausted outdoors. The contaminants may comprise carbon dioxide, volatile organic compounds, sulfur oxides, radon, nitrous oxides or carbon monoxide, for example.

The regeneration can be facilitated by elevating the temperature of the sorbent and purging it with outdoor air, acting as a purge gas, to carry away the adsorbed contaminants. In some embodiments, the heat is delivered to the sorbent by using heated outdoor air. Such heating can be achieved by a variety of methods, for example a heating coil on the incoming path of the purge gas. The heating of the purge gas represents a potential additional energy cost for operating such a regenerable sorbent scrubber, especially if the outdoor air temperature is substantially lower than the temperature required for regenerating the sorbent.

In some embodiments, the energy usage of a scrubber using regenerable sorbents may be improved by introducing a heat exchanger assembly or by heating the sorbent in a closed loop. For example, in some embodiments, during regeneration of the sorbents, incoming purge gas may capture heat from the exhausted purge gas by means of a heat exchanger assembly, for elevating the temperature of the incoming purge gas prior to entering thereto. In some embodiments, the sorbent may be heated by circulating heated air in a closed loop with respect to the sorbent until the sorbent reaches its target regeneration temperature, significantly reducing the loss of heating energy to the exhausted purge gas.

Such embodiments can reduce the amount of energy consumed by the system, or enable a higher gas temperature reaching the sorbent, thereby accelerating the regeneration and improving the net operating time of the scrubber.

In some embodiments, a system for regenerating a sorbent material of a scrubber is provided, where the scrubber is configured for scrubbing a contaminant from indoor air from an enclosed space. The system includes a sorbent material portion (SMP) including a sorbent material, which may be configured to be cycled between at least two operational phases including an adsorption phase for adsorbing a contaminant from indoor air, and a regeneration phase configured for releasing at least a portion of the contaminant adsorbed by the sorbent material during the adsorption phase thereof, via temperature swing adsorption, into a purging airflow (which may be configured to flow over and/or through the sorbent). The system may further include a heater configured to heat at least one of the sorbent material and the purging airflow to a regeneration temperature, and a heat exchanger configured to transfer heat from a purging airflow exiting the SMP after flowing over and/or through the sorbent material (i.e., an exhausted purging airflow) to an incoming fresh purging airflow.

In some embodiments, the enclosed space may comprise a building, a house, a vehicle, or a vessel. The contaminant may be selected from the group consisting of carbon dioxide, volatile organic compounds, sulfur oxides, radon, nitrous oxides and carbon monoxide.

In some embodiments, the purging airflow may comprise outdoor air, and wherein the system may further comprise an outdoor air inlet configured to receive the outdoor air at an outdoor air temperature, and the received outdoor air may be heated directly and/or indirectly by the heater to at least the regeneration temperature. The system may further comprise an exhaust air outlet for discharging an exhausted purging airflow, and a conduit, wherein during at least an initial or first phase of the regeneration phase, the conduit may be configured in a closed loop or shunt conduit arrangement with the SMP (e.g., the outdoor air inlet and the exhaust air outlet thereof), such that during at least the initial phase of the regeneration phase, the purging airflow exiting from the SMP is directed back to an inlet/entrance of the SMP to be flowed over and/or through the sorbent material again In some embodiments, the heater may be selected from the group consisting of an electrical coil, a hot fluid coil, a furnace, and a solar heating device. The configuration of the heat exchanger may be selected from the group consisting of a shell and tube configuration, an air coil configuration, a plate configuration, a counter-flow configuration, and a fin configuration. The heat exchanger may further comprise an outdoor air inlet for receiving an incoming fresh purging airflow and/or an exhaust air outlet for discharging an exhausted purging airflow.

In some embodiments, the system may further comprise an incoming purging airflow conduit and an exhausted purging airflow conduit, wherein the heat exchanger is configured to transfer heat from the exhausted purging airflow to the incoming purging, via thermal communication between the exhausted purging airflow conduit and the incoming purging airflow conduit.

In some embodiments, the heat exchanger may be configured to transfer heat from the exhausted purging airflow to the incoming purging airflow in an amount approximately equal to H given by the expression $H=(T_e-T_0) \times E \times F$, wherein E is an efficiency coefficient of the heat exchanger, F is a flow rate of the incoming purging airflow, $T_0$ is the temperature of the outdoor air, and $T_e$ is the temperature of the exhausted purging airflow. The system may further comprise a fan to at least aid in the flow of indoor air and/or the purging airflow.

According to some embodiments, there is provided a system for regenerating a sorbent material of a scrubber configured for scrubbing a contaminant from indoor air from an enclosed space comprising a sorbent material portion (SMP) including a sorbent material which is configured to be cycled between an adsorption phase for adsorbing a contaminant from indoor air, and a regeneration phase configured for releasing at least a portion of the contaminant adsorbed by the sorbent material during the adsorption phase thereof, via temperature swing adsorption into a purging airflow. The system may include a heater configured to heat at least one of the sorbent material and the purging airflow for flowing over and/or through the sorbent material to a regeneration temperature, and a shunt conduit, wherein during at least an initial or first phase of the regeneration phase, the shunt conduit is configured in a closed loop arrangement with the SMP, such that an exhausted purging airflow exiting the SMP is directed back into the SMP so as to be flowed over at least one of the heater and over and/or through the sorbent material.

In some embodiments, the conduit may be configured in the closed loop arrangement at least until the temperature of the sorbent material reaches the regeneration temperature. During a second phase of the regeneration phase the shunt conduit may be sealed by one or more dampers and the purging air flow is exhausted outside.

According to some embodiments, there is provided a method for regenerating a sorbent material of a scrubber for scrubbing a contaminant from indoor air from an enclosed space, comprising receiving a flow of outdoor air configured as an incoming fresh purging airflow to regenerate a sorbent material of a scrubber, the sorbent material configured to be cycled between an adsorption phase for adsorbing a contaminant from indoor air, and a regeneration phase for releasing at least a portion of the adsorbed contaminant thereof into the incoming fresh purging airflow, and facilitating thermal communication of the incoming fresh purging airflow with an exhausted purging airflow after having flowed over and/or through the sorbent material, so as to effect transfer of heat from the exhausted purging airflow to the incoming fresh purging airflow.

In some embodiments, the method may further include directly and/or indirectly heating the incoming fresh purging airflow via a heater to at least aid in heating the incoming fresh purging airflow to at least a regeneration temperature.

In some embodiments facilitating thermal communication between the incoming fresh purging airflow and the exhausted purging airflow is accomplished via a heat exchanger.

In some embodiments, facilitating thermal communication of the incoming fresh purging airflow with the exhausted purging airflow may comprise arranging an exhaust conduit for the exhausted purging airflow in close proximity to an incoming conduit for the incoming fresh purging airflow such that heat is transferred from the exhausted purging airflow to the incoming fresh purging airflow.

According to some embodiments, there is provided a method for regenerating a sorbent material of a scrubbing system for scrubbing a contaminant from indoor air from an enclosed space, comprising during at least an initial time prior to a regeneration phase for regenerating a sorbent material, operating a closed loop airflow over and/or through a sorbent material, and heating, during operation of the closed loop airflow, at least one of the closed loop airflow and/or sorbent material at least until the temperature of the sorbent material reaches a regeneration temperature.

In some embodiments, the method may further comprise receiving a flow of outdoor air configured as an incoming fresh purging airflow to regenerate the sorbent material during at least a portion of the regeneration phase, such that at least a portion of the contaminant previously adsorbed by the sorbent material is released into the incoming fresh purging airflow as it flows over and/or through the sorbent material. The method may further comprise directly and/or indirectly heating the incoming fresh purging airflow to at least a regeneration temperature.

Details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The principles and operations of the systems, apparatuses and methods according to some embodiments of the present disclosure may be better understood with reference to the drawings, and the following description. These drawings are given for illustrative purposes only and are not meant to be limiting.

DETAILED DESCRIPTION OF SOME OF THE EMBODIMENTS

Figure 1A:
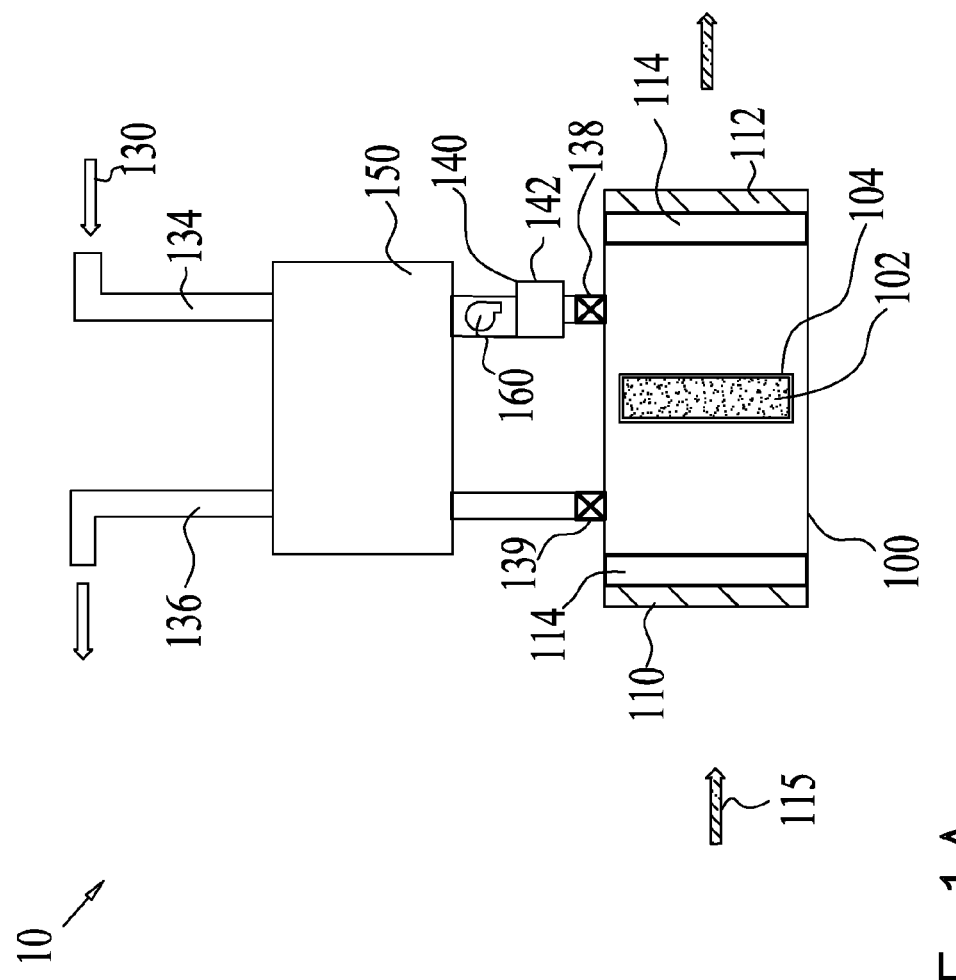
FIGS. 1A-1C are each a schematic illustration of a system for regenerating a sorbent material of a scrubber, according to some embodiments of the present disclosure.
Figure 1B:
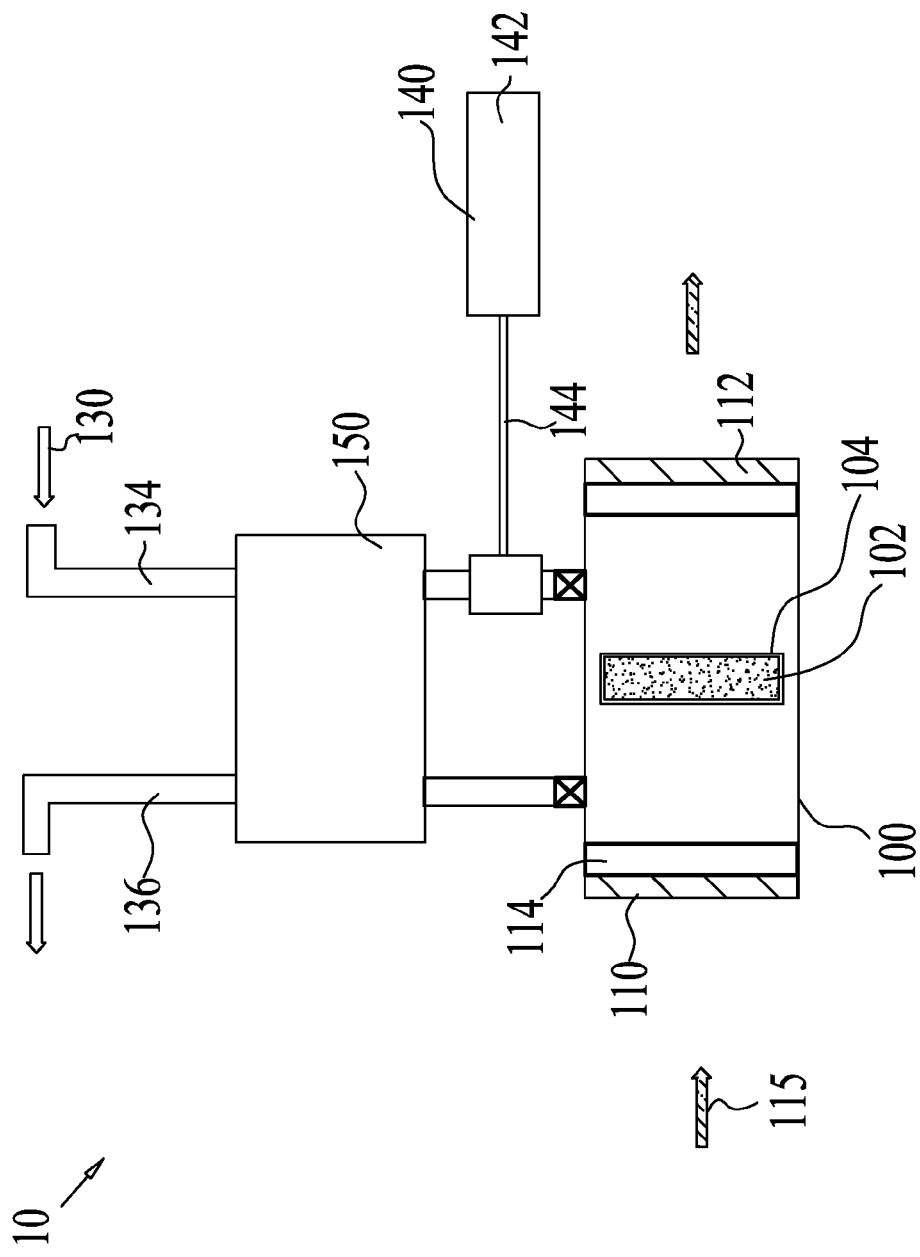
Figure 1C:
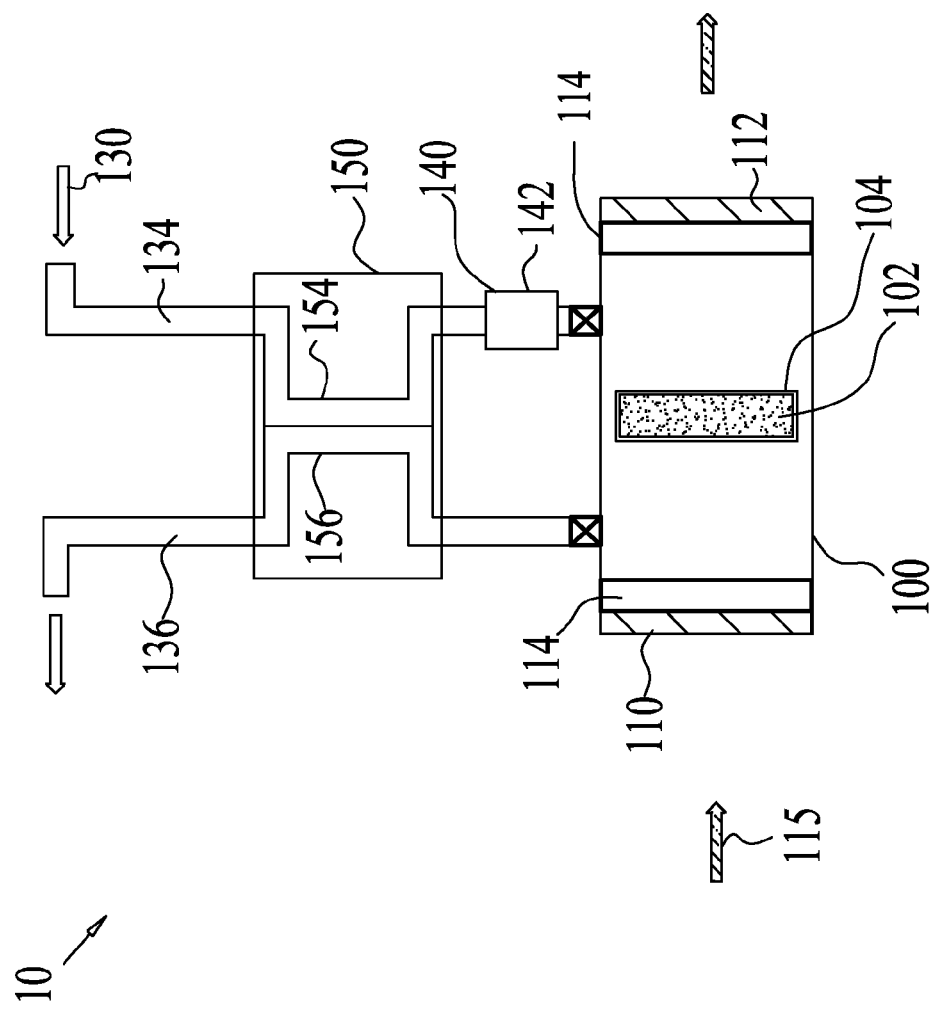

FIGS. 1A-1C each illustrate a schematic diagram of a system 10 for regenerating a sorbent material of a regenerable sorbent based scrubber 100 for indoor air. In some embodiments, the scrubber 100 may comprise a sorbent 102 including a sorbent material, which may be deployed in an enclosure 104, which may or may not be air-tight. The scrubber 100 may include a single or plurality of inlets 110 and outlets 112. In some embodiments, each inlet 110 or outlet 112 may be controlled by a mechanical damper 114, shutter or valve. The scrubber 100 may operate in several modes or phases (such terms may be used interchangeably), including an adsorption phase and a regeneration phase.

During the adsorption phase, at least a portion of indoor air 115 may flow into the scrubber 100 from an enclosed space via inlet 110, and may be forced to flow through the sorbent 102, where contaminants may be trapped and removed from the air stream. Thereafter the air may proceed to emerge from the scrubber 100, via outlet 112. The flow of air through the scrubber 100 may be aided by means of a fan.

During the regeneration phase, outdoor air, a purging airflow or any other purge gas 130, may flow into the scrubber 100 via an outdoor air inlet 134 and may be exhausted as exhausted purge gas via an exhaust air outlet 136. Damper 138 may be provided to control the flow of the incoming purge gas and damper 139 may control the flow of the exhaust purge gas. The direction of flow through sorbent 102 during regeneration may be the same as during adsorption, or reversed to the indoor airflow 115 direction, as shown in FIGS. 1A-1C, depending on the configuration of the respective inlets and outlets.

In some embodiments, the heated purge gas 130 may perform several functions, one of which may include delivering heat to the sorbent 102 so as to elevate its temperature and facilitate the release of adsorbed molecular species, including the contaminants trapped in the sorbent 102, and another may be to dilute and carry away the desorbed molecules. The latter function is best achieved when the incoming purge gas 130 itself has as low as possible a concentration of the desorbed species, and lower than the concentration of the same species in the air that was initially scrubbed by the sorbent. The ability of such a lower contaminant concentration gas flow to induce desorption is sometimes referred to as concentration-swing adsorption/desorption.

In some embodiments, the purge gas 130 may be heated by means of a heating element 140 comprising a heater and configured to come into thermal contact with the incoming purge gas 130, before it reached the sorbent 102.

The heating element 140 can be an electrical coil, a hot fluid coil, a furnace, a solar heating device, or any other suitable heating element. The heating of the incoming air can be performed in a heating unit 142. The heating unit 142 can be attached to the scrubber 100 (FIG. 1A), or can be separately located in relative vicinity to the scrubber 100 where a conduit 144 facilitates thermal contact between the purge gas 130 and the heating element 140 (FIG. 1B).

During regeneration, outdoor air or purge gas 130 may be delivered to and from the inlet 134 and outlet 136. If the entire scrubber 100 is placed outdoors, purge gas 130 can be drawn in simply by opening the damper 138 to the outside, and similarly the purge gas 130 may be exhausted by opening the damper 139 to the outside. However, if the system is placed inside a building, for example, in a mechanical room or a basement, then appropriate ducts or conduits may be required to bring in air from outside the building and to exhaust the purge gas 130 outside the building.

In some embodiments, the purge gas 130, comprising the outdoor air and received via the outdoor air inlet 134, may be heated directly and/or indirectly by the heating element 140 to at least the regeneration temperature.

The incoming purge gas 130 during regeneration may be heated to a temperature $T_i$. In the case of outdoor air, the temperature $T_i$ of the purge gas 130 entering the scrubber 100, may depend on at least three parameters (according to some embodiments):

The temperature $T_0$ of the outdoor air 130 drawn into the heating element 140.

The heat capacity C of the air at the ambient pressure and temperature conditions.

The flow rate F of the outdoor air 130.

The heating power P delivered by the heating element 140.

The change in incoming air temperature of the outdoor air 130, caused by the heating element 140, $\Delta T = T_i - T_0$ is expressed by:

$$\Delta T = \frac{P}{F \times C}$$

As it passes through the sorbent 102, some of the outdoor air heat is transferred to the sorbent 102, thus heating the sorbent 102 while cooling the outdoor air 130. Therefore the exhausted outdoor air 130 exits the scrubber 100 at a temperature $T_e$ which is lower than $T_i$, but may still be higher than $T_0$, namely warmer than the outdoor air 130 before it reaches the heating element 140.

Because $T_i$ may be significant for the speed and efficiency of the regeneration process, and because it is directly related to $T_0$, it is advantageous to increase $T_0$. Increasing $T_0$ allows the system to achieve a higher $T_i$ with the same amount of power P, or alternatively to achieve the same $T_i$ with less power consumption.

In some embodiments, this objective can be accomplished using a heat exchanger assembly 150 to take advantage of the fact that $T_e > T_0$. The heat exchanger assembly 150 may be placed at any suitable location, such as intermediate inlet 134 and outlet 136, as shown in FIGS. 1A and 1B. In some embodiments, the heat exchanger assembly 150 may be mounted directly at the outlet 136. In some embodiments, the heat exchanger assembly 150 may be attached to an inlet of the heating element 140. In some embodiments the heat exchanger assembly 150 may be attached to both inlet 134 and outlet 136 by means of conduits or ducts.

Heat exchange can be performed by any number of means or configurations of heat exchange assemblies for facilitating thermal communication between the exhausted purging airflow and the incoming purging airflow. The heat exchanger assembly 150 may be configured to transfer heat from the exhausted purging airflow to the incoming purging airflow via thermal communication between the exhausted purging airflow conduit and the incoming purging airflow conduit.

The thermal communication may include any type of heat transfer, such as by contact, convention or conduction, for example. In a non-limiting example, the heat exchanger assembly 150 may comprise a shell and tube configuration, an air coil configuration, a plate configuration, a fin configuration or a counter-flow configuration.

In some embodiments, the heat exchanger assembly 150 may be facilitated by having an outdoor air conduit 154, and the exhaust air conduit 156 run in parallel and in close thermal communication over an extended length of these conduits, as seen in FIG. 1C. Thermal communication can be assisted by increasing a shared surface area of the parallel conduits. The outdoor air conduit 154 may comprise an incoming purging airflow conduit and the exhaust air conduit 156 may comprise an exhausted purging airflow conduit.

In some embodiments, counter-flow of the cooler incoming air and the warmer exhaust air can provide a very high rate of heat exchange.

The heat exchange assembly 150 may be designed to transfer heat between two separate gas streams, such as the incoming outdoor air 130 through the inlet 134 and the outdoor air 130 exiting the outlet 136. The amount of heat transferred, H, generally depends on the flow rate and temperature difference between the coupled streams, and on the heat transfer efficiency coefficient, E, of the heat exchange assembly 150, which is determined by the structure and physical properties thereof, as well as the operating conditions.

Thus the heat transfer may be expressed as $$H = (T_e - T_0) \times E \times F$$

The heat transfer may translate directly into a reduction in the required heat of the heating element 140.

Another way to look at the impact of the heat exchange process is the change in temperatures of the two gas streams upon passing through the heat exchange assembly:

$$T_0 \rightarrow T_i = T_0 + \delta T$$

where $T_1$ is the temperature of the incoming outdoor air 130 after it has passed the heat exchange assembly 150 and before reaching the heating element 140, and δT is the increase in its temperature as a result of the heat exchange.

$$T_e \rightarrow T_x = T_e - \delta T'$$

where $T_x$ is the temperature of the outgoing exhaust air after it has passed the heat exchange assembly 150, and δT' is the decrease in its temperature as a result of the heat exchange.

Since this heat is imparted on the incoming outdoor air 130, it reduces the amount of power required for heating, or alternatively higher regeneration temperature is achieved, which in turn, shortens the regeneration time. A shorter regeneration time has at least two benefits: less overall energy used by the heating element, as the heating power is applied during a shorter duration; and larger fraction of the total adsorption-regeneration cycle time is dedicated to adsorption, namely to cleaning the air.

The relative impact of the heat exchange may depend on several parameters, including the efficiency of the heat exchanger and the exhaust temperature $T_e$, and on outside temperature.

According to some embodiments, there is provided the system 10 for regenerating the sorbent material of the scrubber 100, configured for scrubbing and removing a contaminant from indoor air 115 from the enclosed space. The system may comprise a sorbent material portion (SMP) including the sorbent material which is configured to be cycled between: (i) an adsorption phase for adsorbing the contaminant from indoor air 115, and (ii) a regeneration phase configured for releasing at least a portion of the contaminant adsorbed by the sorbent material during the adsorption phase thereof, via temperature swing adsorption into the purge gas 130. The heating element 140, including the heater, may be configured to heat at least one of the sorbent materials and/or the airflow flowing over and/or through the sorbent material to a regeneration temperature. The heat exchanger assembly 150, including the heat exchanger, may be configured to transfer heat from an exhausted purge gas exiting the SMP after flowing over and/or through the sorbent material to an incoming fresh purge gas.

According to some embodiments, there is provided a method for regenerating the sorbent material of the scrubber 100 including a scrubber 102 for scrubbing the contaminant from indoor air 115 from the enclosed space, comprising: (i) receiving a flow of outdoor air 130 configured as an incoming fresh purging airflow to regenerate the sorbent material of the scrubber 102. The sorbent material may be configured to be cycled between an adsorption phase for adsorbing the contaminant from indoor air 115, and a regeneration phase for releasing at least a portion of the adsorbed contaminant thereof into the incoming fresh purging airflow; and (ii) facilitating thermal communication of the incoming fresh purging airflow with an exhausted purging airflow after having flowed over and/or through the sorbent material, so as to effect transfer of heat from the exhausted purging airflow to the incoming fresh purging airflow.

The examples as set forth herein are meant to exemplify some of the various aspects of carrying out the invention and are not intended to limit the invention in any way.

Example Procedure

The optimal regeneration temperature is 60° C., and circulating indoor air is kept between 20-25° C., while outdoor air is 30° C. As regeneration begins, the sorbent is approximately at indoor temperature. Purge air is heated to 50° C., and the exhaust air is initially cooled by the sorbent emerging at approximately 35° C. As the regeneration proceeds, the sorbent gets warmer as does the exhaust purge air, approaching 45° C. towards the end of the regeneration phase. An ideal heat exchanger would heat the incoming air by 5-15° C. during the phase, on average about 10° C. representing about $\frac{1}{3}^{rd}$ of the heat required for the 30 degree differential between outdoor air temperature of 30° C. and the required 60° C. optimal regeneration temperature.

Example Procedure

The same conditions as in the previous example except that outdoor air is 0° C. An ideal heat exchanger would heat the incoming air by 35-45° C. during the phase, on average about 40° C. representing about $\frac{2}{3}^{rd}$ of the heat required for the 60 degree differential between outdoor air temperature of 0° C. and the required 60° C. optimal regeneration temperature.

In some embodiments, as seen in FIG. 1A, a fan 160 may be provided to urge the flow of the incoming purge gas 130 and aid the flow of indoor air and/or purge gas 130.

Figure 2A:
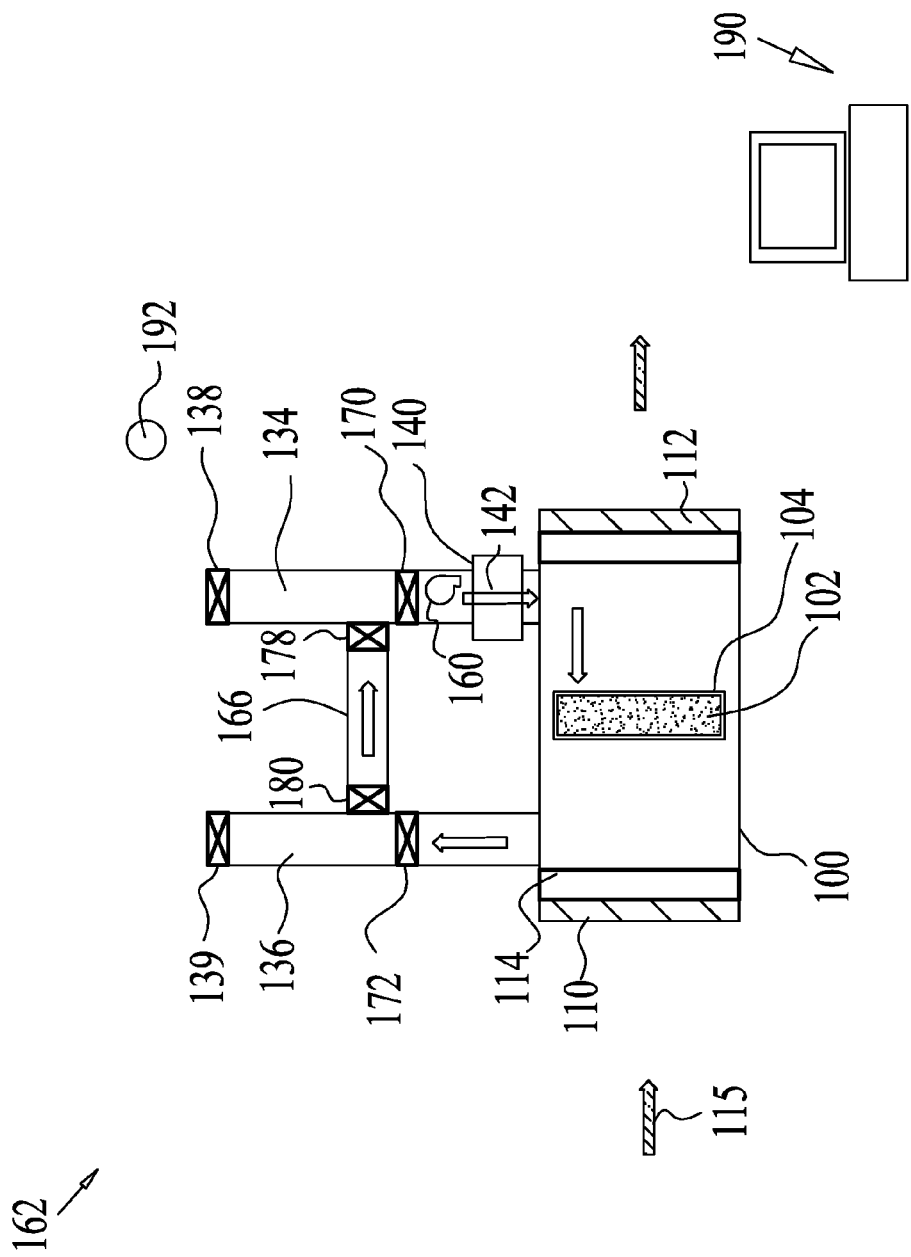
FIGS. 2A and 2B are a schematic illustration of a system for regenerating a sorbent material of a scrubber at a first operational phase (FIG. 2A) and at a second operational phase (FIG. 2B) according to some embodiments of the present disclosure.
Figure 2B:
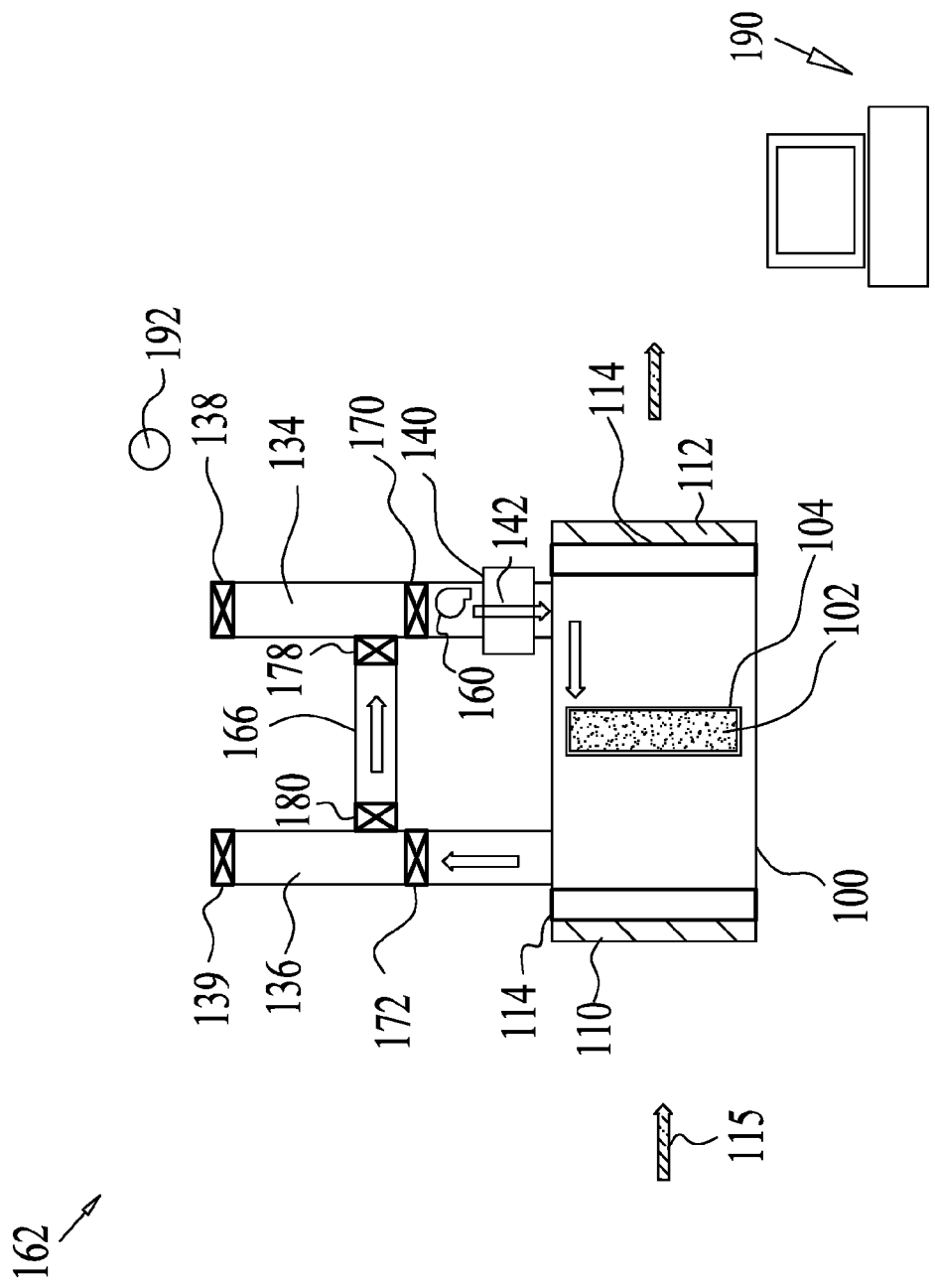

FIGS. 2A and 2B illustrate system 162 for regenerating a sorbent material of the scrubber 100 according to some embodiments. The system 162 is designed to reduce the energy and heat required to regenerate the sorbent in scrubber 100. Similar to the embodiments of FIGS. 1A-1C, during regeneration, purge gas 130 may enter the scrubber 100 via inlet 134 and exits via outlet 136, the fan 160 may be provided to urge the flow of the incoming purge gas 130 and aid the flow of indoor air and/or purge gas 130. Heating element 140 may be provided to heat the incoming purge gas 130.

As seen in FIGS. 2A and 2B, a shunt conduit 166 or any suitable connection may be installed to shunt exiting regeneration purge gas back into the sorbent 102 via the regeneration inlet 134, through the fan 160 and the heating element 140. Dampers 170 and 172 may temporarily block the entry of fresh purge gas 130, via inlet 134, and exit of the exhausted purge gas, via outlet 136, to the outside. In other words, the shunt conduit 166 and the dampers 170 and 172 may force air inside the scrubber 100 to flow in a closed loop, rather than continually bring in fresh regeneration gas and exhaust the purge gas after it has passed through the sorbent 102.

In some embodiments, it is beneficial that the heat that is delivered to the purge gas 130 is not lost to the exhaust purge gas exiting into the outside, but is kept in circulation in a closed loop, and not needing to heat an inflow of fresh outside air, thus again allowing the purge gas 130 and the sorbent 102 to reach a target temperature faster or with less heating power.

In some embodiments, the closed loop circulation means that contaminant molecules may be kept inside and thus the sorbent 102 may not be fully cleansed. This can be addressed by conducting two separate phases in the regeneration phase, as follows.

Phase 1: Closed Loop Heating (FIG. 2A). During this phase, the shunt conduit 166 is open, the outside regeneration dampers 170 and 172 are sealed, the heating element 140 and/or fan 160 may be in operation. The exhaust purge gas 130 exits the sorbent 102 and flows into the shunt conduit 166 and circulates until the purge gas 130 reaches the target regeneration temperature.

Phase 2: Open Purge (FIG. 2B). During this phase, the shunt conduit 166 is sealed with shunt dampers 178 and 180 and the outside dampers 170 and 172 are open, allowing fresh outdoor air to flush the sorbent 102 and exhaust, carrying away the adsorbed contaminants. During this step, the heating element 140 may be on or off, depending on a number of considerations including the outdoor air temperature, the rate of cooling of the sorbent 102 and the time required to complete the flushing.

In some embodiments, the switchover from Phase 1 to Phase 2 can be performed automatically by a controller 190, such as an electronic control system, based on any parameter including actual temperature achieved or a timed duration.

The parameters may be measured by sensors 192. The sensors 192 may be configured in any suitable manner for detecting parameters of the airflow, for example, the sensors 192 may include electronic sensors and may be placed at any suitable location.

In some embodiments, the shunt conduit 166 can be a built-in or integral part of the scrubber 100. In other embodiments, the shunt conduit 166 can be installed externally, such as by means of conventional air ducts or tubes.

In some embodiments, to model the energy use in the case of the shunt conduit 166, a time dependent analysis may be required, where $T_s(t)$ is the temperature of the sorbent 102 and approximately also the temperature of the air returning from the shunt conduit 166 to the fan 160, and the power $P(t)$ adjusts so as to deliver the same air temperature into the scrubber 100, but does not exceed its maximum value $P_{max}$ and does not allow the air temperature to exceed $T_{max}$.

The ingoing air temperature $T_p(t)$ is then given by:

$$T_p(t) = \min[T_{max}, T_s(t) + \Delta T]$$

where $\Delta T$ is the increase in temperature due to the heating element 140.

The rate of heat transfer to the sorbent 102, $Q(t)$ depends on the temperature difference between the sorbent 102 and the incoming purge air or purge gas 130, with some system dependent coefficient we denote as $\gamma$:

$$Q(t) = \gamma \times (T_p(t) - T_s(t))$$

And the rate of change of the sorbent temperature is simply given by its heat input $Q(t)$ divided by its heat capacity, $C_s$, we arrive at a simple differential equation:

$$\frac{\partial T_s}{\partial t} = \frac{\gamma}{C_s}(T_p - T_s)$$

This equation approximately solves for an exponential time dependence:

$$T_s(t) \sim T_0 + (T_{max} - T_0)e^{-(\gamma/C_s)t}$$

that asymptotically approaches $T_p$ and therefore $T_{max}$, and the rate of approach, namely the heating time, depending on the choice of system parameters such as, for example, sorbent mass, heating element power, and air flow rate.

According to some embodiments, there is provided the system 162 for regenerating the sorbent material of the sorbent 102 of the scrubber 100. The system 162 may comprise a sorbent material portion (SMP) which may include the sorbent material which is configured to be cycled between (i) the adsorption phase for adsorbing a contaminant from indoor air, and (ii) a regeneration phase configured for releasing at least a portion of the contaminant adsorbed by the sorbent material during the adsorption phase thereof, via temperature swing adsorption into a purging airflow. The system 162 may comprise the heating element 140, which may be configured to heat at least one of the sorbent material and the purging airflow for flowing over and/or through the sorbent material to a regeneration temperature. The system 162 may comprise the shunt conduit 166, wherein during at least an initial phase of the regeneration phase, the shunt conduit 166 may be configured in a closed loop arrangement with the SMP such that an exhausted purging airflow exiting the SMP is directed back through the heating element 140 and over and/or through the sorbent material.

According to some embodiments, there is provided a method for regenerating the sorbent material of the scrubber 100 for scrubbing the contaminant from indoor air 115 from an enclosed space, comprising: (i) during at least an initial time prior of a regeneration phase for regenerating the sorbent material, operating a closed loop airflow over and/or through the sorbent material; and (ii) heating, during operation of the closed loop airflow, at least one of the closed loop airflow and/or sorbent material at least until the temperature of the sorbent material reaches a regeneration temperature.

Dampers 178 and 180 may be formed as a three-way damper. It is noted that in addition or in place of the dampers and fans described herein, other components such as valves, blowers, or shutters, may be used to control the volume of indoor air 115 and/or outdoor air 130 entering and/or exiting the scrubber 100.

In some embodiments, system 162 may additionally include the heat exchanger assembly 150 of system 10 and may be used for transferring heat from the exhausted purging airflow exiting the SMP after flowing over and/or through the sorbent material to the incoming fresh purging airflow.

The enclosed pace may include any closed area such as buildings, homes, vessels or vehicles.

The scrubber 100 may be placed in any suitable location. In some embodiments, the scrubber 100 may operate in conjunction with an air handling unit of a centralized HVAC. In some embodiments, the scrubber 100 may operate in conjunction with an air handling unit of a distributed air circulation system, such as a fan-coil system. In some embodiments, the scrubber 100 may be a stand-alone-unit and may be placed in an enclosed space.

Various implementations of some of embodiments disclosed, in particular at least some of the processes discussed (or portions thereof), may be realized in digital electronic circuitry, integrated circuitry, specially configured ASICs (application specific integrated circuits), computer hardware, firmware, software, and/or combinations thereof. These various implementations, such as associated with the controller 190 or control unit, for example, may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

Such computer programs (also known as programs, software, software applications or code) include machine instructions/code for a programmable processor, for example, and may be implemented in a high-level procedural and/or object-oriented programming language, and/or in assembly/machine language. As used herein, the term "machine-readable medium" refers to any computer program product, apparatus and/or device (e.g., non-transitory mediums including, for example, magnetic discs, optical disks, flash memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the subject matter described herein may be implemented on a computer having a display device (e.g., a LCD (liquid crystal display) monitor and the like) for displaying information to the user and a keyboard and/or a pointing device (e.g., a mouse or a trackball, touchscreen) by which the user may provide input to the computer. For example, this program can be stored, executed and operated by the dispensing unit, remote control, PC, laptop, smart-phone, media player or personal data assistant ("PDA"). Other kinds of devices may be used to provide for interaction with a user as well. For example, feedback provided to the user may be any form of sensory feedback (e.g., visual feedback, auditory feedback, or tactile feedback), and input from the user may be received in any form, including acoustic, speech, or tactile input. Certain embodiments of the subject matter described herein may be implemented in a computing system and/or devices that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components.

The components of the system may be interconnected by any form or medium of digital data communication (e.g., a communication network). Examples of communication networks include a local area network ("LAN"), a wide area network ("WAN"), and the Internet. The computing system according to some such embodiments described above may include clients and servers. A client and server are generally remote from each other and typically interact through a communication network. The relationship of client and server arises by virtue of computer programs running on the respective computers and having a client-server relationship to each other.

Any and all references to publications or other documents, including but not limited to, patents, patent applications, articles, webpages, books, etc., presented anywhere in the present application, are herein incorporated by reference in their entirety.

Example embodiments of the devices, systems and methods have been described herein. As may be noted elsewhere, these embodiments have been described for illustrative purposes only and are not limiting. Other embodiments are possible and are covered by the disclosure, which will be apparent from the teachings contained herein. Thus, the breadth and scope of the disclosure should not be limited by any of the above-described embodiments but should be defined only in accordance with claims supported by the present disclosure and their equivalents. Moreover, embodiments of the subject disclosure may include methods, systems and devices which may further include any and all elements/features from any other disclosed methods, systems, and devices, including any and all features corresponding to systems, methods and devices for regenerating a sorbent material. In other words, features from one and/or another disclosed embodiment may be interchangeable with features from other disclosed embodiments, which, in turn, correspond to yet other embodiments. Furthermore, one or more features/elements of disclosed embodiments may be removed and still result in patentable subject matter (and thus, resulting in yet more embodiments of the subject disclosure). Also, the lack of one or more features, structure, and/or steps for one and/or another embodiment as compared to the prior art which includes such a feature(s), structure, and/or step(s) provides yet additional patentable embodiments for the present disclosure (i.e., claims for one and/or another embodiments may include negative limitations for being distinguished from the prior art).

What is claimed is:

1. A system for regenerating a sorbent material of a scrubber configured for scrubbing a contaminant from indoor air from an enclosed space comprising:
    a sorbent material portion (SMP) including a sorbent material, the SMP configured to be cycled between at least two operational phases including:
        an adsorption phase for adsorbing a contaminant from indoor air, and
        a regeneration phase configured for releasing at least a portion of the contaminant adsorbed by the sorbent material during the adsorption phase thereof via temperature swing adsorption into a purging airflow, the purging airflow configured to flow over and/or through the sorbent material during the regeneration cycle;
    a heater configured to heat at least one of the sorbent material and the purging airflow to a regeneration temperature;
    a heat exchanger configured to transfer heat from the purging airflow exiting the SMP after flowing over and/or through the sorbent material to an incoming fresh purging airflow;
    an outdoor air inlet configured to receive the outdoor air at an outdoor air temperature, and a conduit configurable to establish a closed loop or shunt arrangement with the SMP, wherein:
        the purging airflow comprises outdoor air,
        the received outdoor air is heated directly and/or indirectly by the heater to at least the regeneration temperature, and
        the conduit configurable to establish the closed loop or shunt arrangement with the SMP such that during at least an initial phase of the regeneration phase, the purging airflow exiting from the SMP is directed back to an inlet of the SMP to be flowed over and/or through the sorbent material again.

2. The system of claim 1, wherein the enclosed space comprises a building, a house, a vehicle, or a vessel.

3. The system of claim 1, wherein the contaminant is selected from the group consisting of: carbon dioxide, volatile organic compounds, sulfur oxides, radon, nitrous oxides and carbon monoxide.

4. The system of claim 1, wherein the heater is selected from the group consisting of: an electrical coil, a hot fluid coil, a furnace, and a solar heating device.

5. The system of claim 1, wherein configuration of the heat exchanger is selected from the group consisting of: a shell and tube configuration, an air coil configuration, a plate configuration, a counter-flow configuration, and a fin configuration.

6. The system of claim 1, wherein the heat exchanger further comprises an outdoor air inlet for receiving an incoming fresh purging airflow and/or an exhaust air outlet for discharging an exhausted purging airflow.

7. The system of claim 1, further comprising an incoming purging airflow conduit and an exhausted purging airflow conduit, wherein the heat exchanger is configured to transfer heat from the exhausted purging airflow to the incoming purging airflow via thermal communication between the exhausted purging airflow conduit and the incoming purging airflow conduit.

8. The system of claim 1, wherein the heat exchanger is configured to transfer heat from the exhausted purging airflow to the incoming purging airflow in an amount approximately equal to H given by the expression $H=(T_e-T_0) \times E \times F$, wherein E is an efficiency coefficient of the heat exchanger, F is a flow rate of the incoming purging airflow, $T_o$ is the temperature of the outdoor air, and $T_e$ is the temperature of the exhausted purging airflow.

9. The system of claim 1, further comprising a fan to at least aid in the flow of indoor air and/or the purging airflow.

10. A system for regenerating a sorbent material of a scrubber configured for scrubbing a contaminant from indoor air from an enclosed space comprising:
   a sorbent material portion (SMP) including a sorbent material, the SMP configured to be cycled between at least two operational phases including:
      an adsorption phase for adsorbing a contaminant from indoor air, and
      a regeneration phase configured for releasing at least a portion of the contaminant adsorbed by the sorbent material during the adsorption phase thereof via temperature swing adsorption into a purging airflow;
   a heater configured to heat at least one of the sorbent material and the purging airflow to a regeneration temperature; and
   a shunt conduit configurable in a closed loop arrangement with the SMP, such that during at least a first phase of the regeneration phase, the purging airflow exiting from the SMP is directed back to an inlet of the SMP to be flowed over and/or through the sorbent material again.

11. The system of claim 10, wherein the conduit is configured in the closed loop arrangement at least until the temperature of the sorbent material reaches the regeneration temperature.

12. The system of claim 10, wherein during a second phase of the regeneration phase the shunt conduit is closed off by one or more dampers and the purging air flow is exhausted to the outdoor environment.

13. A method for regenerating a sorbent material of a scrubbing system for scrubbing a contaminant from indoor air from an enclosed space, comprising:
   during at least an initial time period prior to a regeneration phase for regenerating a sorbent material, operating a closed loop airflow over and/or through a sorbent material; and
   heating, during operation of the closed loop airflow, at least one of the closed loop airflow and/or sorbent material at least until the temperature of the sorbent material reaches a regeneration temperature.

14. The method of claim 13, further comprising:
   receiving a flow of outdoor air configured as an incoming fresh purging airflow to regenerate the sorbent material during at least a portion of the regeneration phase, such that at least a portion of the contaminant previously adsorbed by the sorbent material is released into the incoming fresh purging airflow as it flows over and/or through the sorbent material.

15. The method of claim 14, further comprising directly and/or indirectly heating the incoming fresh purging airflow to at least a regeneration temperature.

16. The method of claim 13, wherein the contaminant is selected from the group consisting of: carbon dioxide, volatile organic compounds, sulfur oxides, radon, nitrous oxides and carbon monoxide.

* * * * *